Patented Aug. 28, 1934

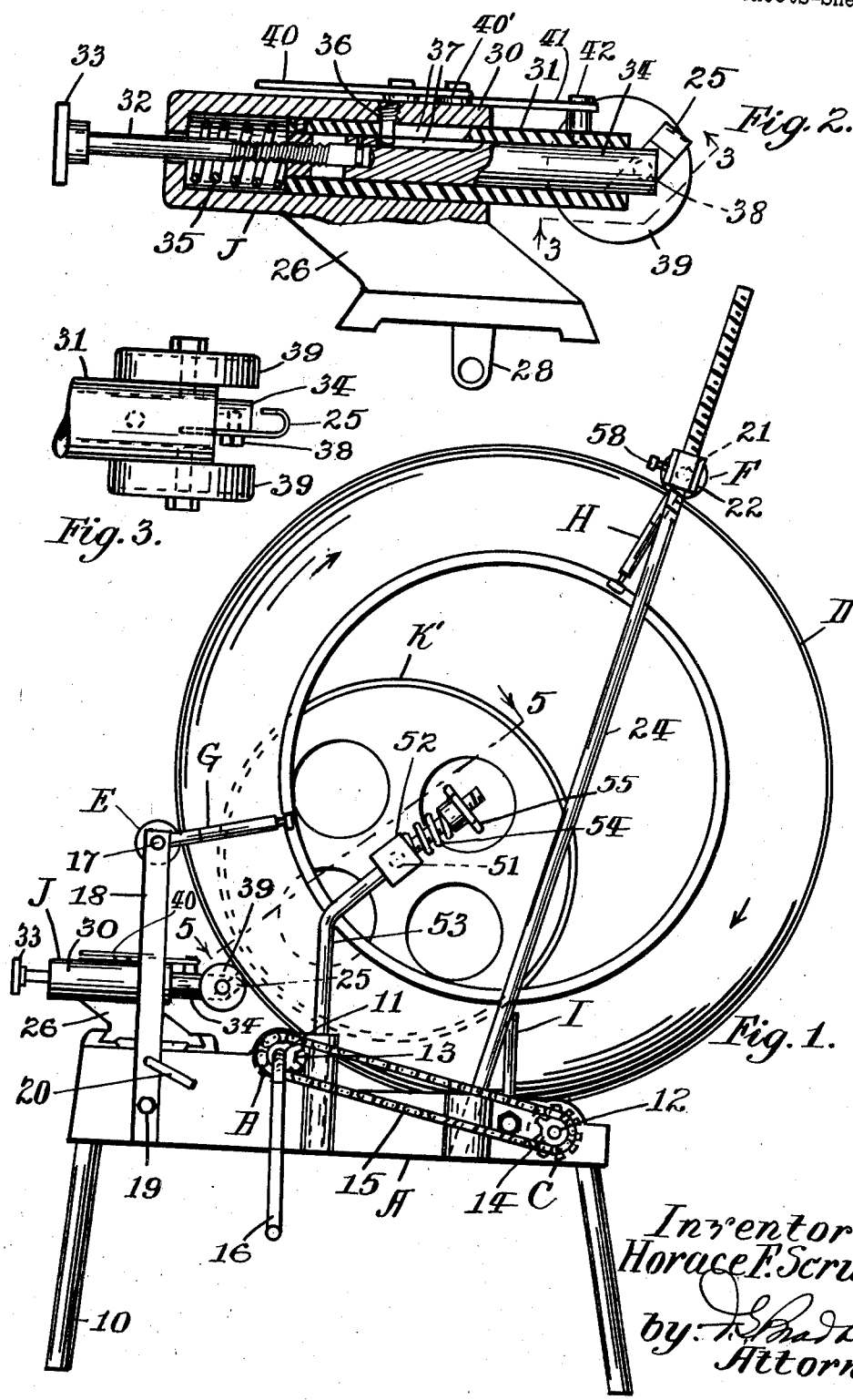

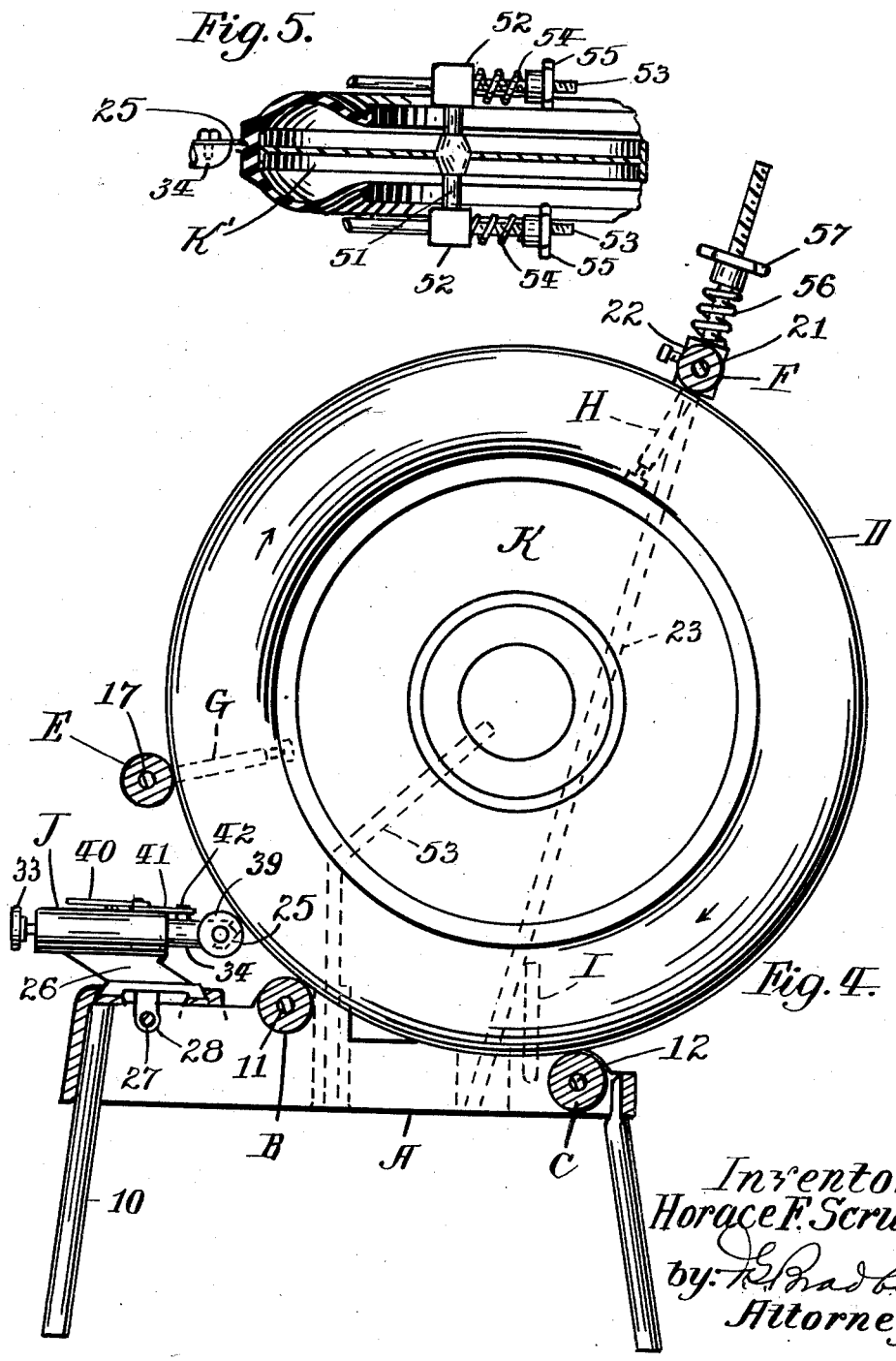

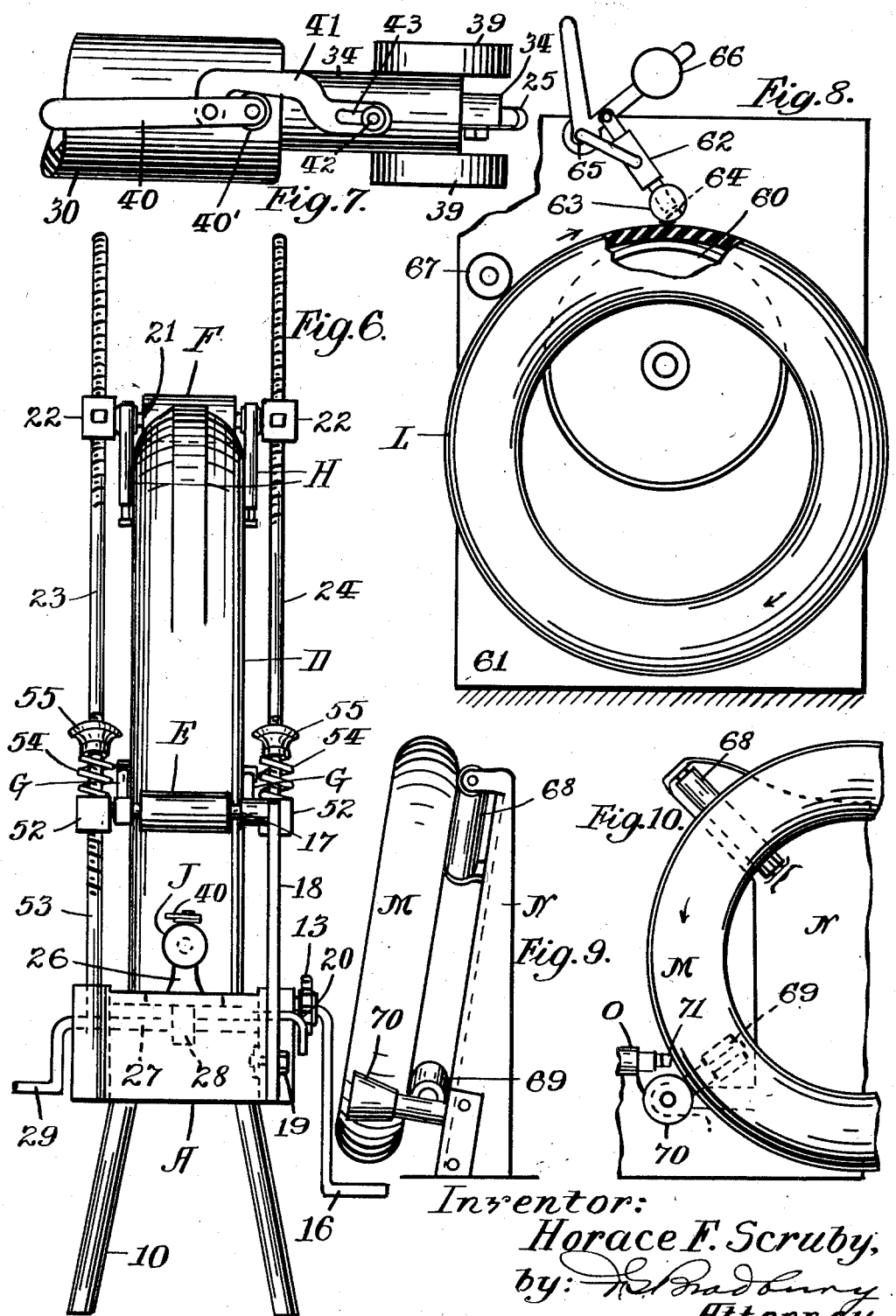

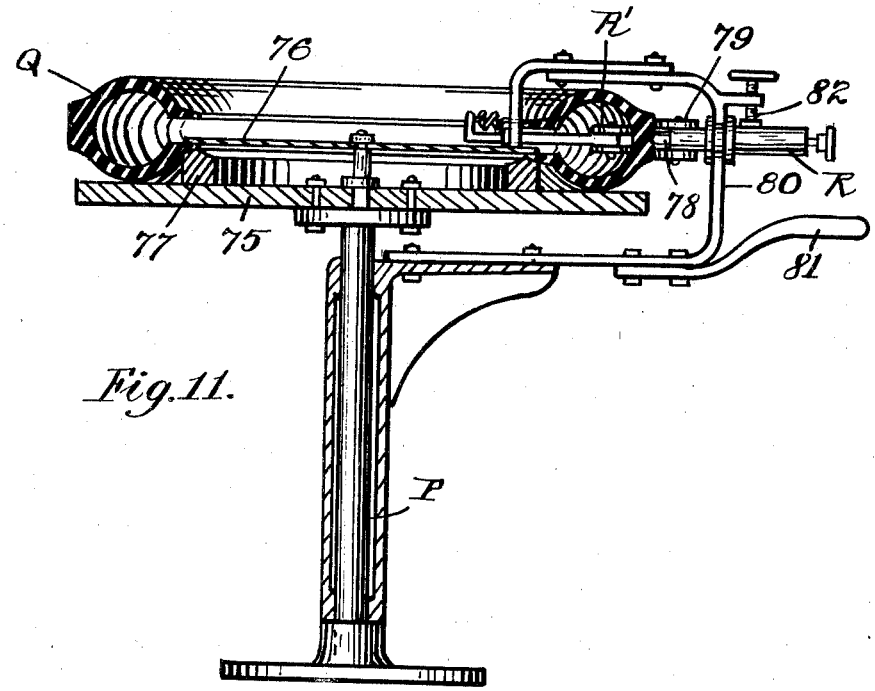
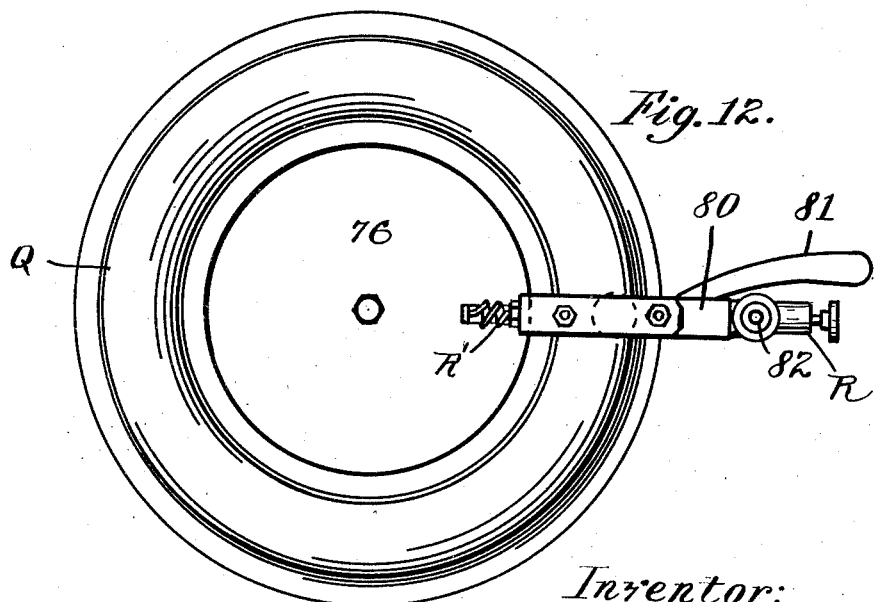

1,971,582

UNITED STATES PATENT OFFICE 1,971,582

TIRE GROOVING MACHINE

Horace F. Scruby, Beverly Hills, Calif.

Application May 16, 1932, Serial No. 611,611

9 Claims. (Cl. 82—1)

An object of this invention is the production of a simple, inexpensive and effective machine, by the use of which the tread surface of a used or new vehicle tire can be easily and quickly grooved circumferentially, while the tire is mounted upon a wheel or demounted, for the purpose of preventing the tire from slipping or skidding on slippery, muddy or sandy roads. In my companion application for patent, filed April 11, 1932, bearing Serial Number 604,503, I have described a tire grooving device which is applicable for use in grooving a tire while the latter is mounted upon a vehicle wheel, while the wheel remains on the vehicle and while the vehicle is jacked up so that the wheel is adapted to revolve in cutting coaction with the groove cutter. With the present invention, a further object is to provide tire holding, revolving and supporting means of novel form, in cooperation with a tire cutter, whereby the tire, while deflated or inflated, while mounted or demounted and while separated from the vehicle can be most effectively grooved or otherwise dressed. A further object is to provide an internal back rest between the sides and against the inner wall of the tread portion of a tire casing whereby cutting or other dressing means may be caused to coact with the more or less flexible casing to trim its tread surface most effectively. A still further object is to provide adjustments and structure not disclosed in my companion application to accommodate and revolubly hold tires of various types and sizes, while being grooved, in most effective cooperation with the cutting device.

With these and other objects in view, my invention comprises the features of construction and combinations of parts hereinafter described and claimed.

In the accompanying drawings, forming part of this specification, Figure 1 is an elevation of my invention; Fig. 2 is an elevation of the groove cutting device removed from the machine, part of the structure being shown by vertical longitudinal section; Fig. 3 is a view of a detail taken on line 3—3 of Fig. 2; Fig. 4 is a vertical longitudinal section of the grooving machine when used for grooving an inflated tire mounted upon a wheel; Fig. 5 is a section of a detail taken on the line 5—5 of Fig. 1; Fig. 6 is a front elevation of the grooving machine; Fig. 7 is a plan of a detail showing a portion of the cutting device and its means for withdrawing and holding the cutting tool in inactive position; Figs. 8 to 10 are elevations of alternative constructions; Fig. 11 is a vertical central section of an alternative construction, and Fig. 12 is a plan of the structure shown in Fig. 11.

In the drawings, A indicates the base of any suitable configuration, forming part of a support for the working parts of the machine, said base when desired being provided with stability legs 10. Journaled transversely in the base with their axes parallel and horizontal are drive rollers B and C, said rollers being arranged to support the tire D in rolling contact therewith and by their revolution revolving the tire. These drive rollers are mounted on shafts 11 and 12, which in turn are journaled in the sides of the base and carry drive sprockets 13 and 14. A chain belt 15 engaging the sprockets and a handle 16 on shaft 15 serve to assist in synchronously revolving the drive rollers and propelling the tire. Idle rollers E and F, relatively arranged with the drive rollers circumferentially about and bearing in rolling contact against the periphery of the tire cause the tire to revolve evenly. Roller E is journaled on shaft 17 and shaft 17 is carried by supporting rod 18 which extends upwardly from the base and is pivotally secured thereto by bolt 19 and threaded binding bolt 20 so that by loosening said bolt 20 the roller can be swung clear of the tire to facilitate inserting or removing the tire or adjusting the roller to different sized tires in the machine. Roller F is journaled on shaft 21 and said shaft has supporting blocks 22 on its opposite ends which are slidable freely over the upwardly extending supporting rods 23 and 24, said rods being socketed in the sides of the base on opposite sides of the tire held in the machine. Pairs of side guides G, H, and I are distributed circumferentially around the tire to revolubly hold and straddle the tire inwardly so that it will revolve freely in a vertical plane. Guides G are supported by shaft 17, guides H are supported by shaft 21 and guides I are supported by the sides of the base.

J indicates a groove cutting device which is positioned in front of the tire on the base with its cutting blade 25 in cutting coactive relation to the tire tread below the center of the tire and so that as the tire is revolved upwardly in the direction of the arrows shown in Fig. 1, the tire is grooved circumferentially. The groove cutting device has a carriage 26 gibbed in the base to permit transverse movement horizontally so that the cutting blade 25 can be applied in selected position to cut a number of spaced parallel circumferential grooves in the tread surface of the tire. The movement of the carriage may be by means of a revoluble shaft 27 journaled in the base, threaded through the lug 28 integral with the base and revolved by handle 29. The carriage has a sleeve 30 (see Fig. 2) directed towards the tire in which a cutter applicating tube 31 is slidable longitudinally. In the inner end of this tube an adjusting stem 32 is threaded and adapted to be revolved by handle 33. An adjustable shaft 34 is slidable longitudinally in tube 31 and carries on its outer end the cutter blade 25 and is swiveled to the inner end of the adjusting stem 32. Normally the supporting tube 31 is forced outwardly towards the tread surface of the tire by the compression spring 35 so as to urge the cutter against the tire. A bolt 36 through sleeve 30 and entering slots 37 in tube 31 and shaft 34 serves to prevent tube 30 and shaft 34 from turning and to permit limited longitudinal movement. The cutting blade 25 is semi-circular in shape or may be any shape desired to cut the groove in the tire and is held upwardly in forwardly inclined position with its cutting edge directed downwardly by securing its shank upon the side of the outer end of the supporting shaft 34 by bolt 38 or other suitable means. Any other shaped cutter or a grinder may be used for dressing the surface of the tire. A pair of idle gauge rollers 39 journaled freely on the outer end of shaft 34 in position to roll freely against the periphery of the tire, serve to define and gauge the even depth of cut imparted by the cutter while the spring 35 compensates for inequalities in the surface of the tire due to uneven wear or other reasons.

To withdraw the cutter and gauge rollers outwardly from cutting position, a lever handle 40 is pivoted at one end on a support 40' carried by sleeve 30 and its median portion is pivoted to the outer end of an off set pull rod 41 which is freely attached to tube 31 by a pin 42 through pin receiving slot 43. The shape of the pull rod 41 and the position of its connection with lever handle 40 is such as to cause one end of the pull rod 41 to lodge behind the support 40' and hold the cutter and gauge rollers 39 in inactive position. When handle 40 is reversed the pull rod 41, tube 31, cutter 25 and gauge rollers 39 are released and the cutter and gauge rollers thereupon function coactively with the tread surface of the tire casing under the action of spring 35.

The tire D to be grooved or otherwise dressed may be a tire mounted upon a wheel K and inflated as shown in Fig. 4. When in demounted condition the tire or what is commonly termed the tire casing is placed in the machine as shown in Fig. 1 and a rest adjusted over the inner wall of the casing opposite the cutter so as to support or assist in supporting and guiding the tire while moving and under the direct action of the cutter. This rest may be of any suitable construction, an effective form being an idle wheel K' which is adapted to revolve in the plane of the tire. This wheel is placed between the sides with its periphery resting against the inner wall of the casing so as to revolve with the casing by reason of contact therewith. This rest wheel is journaled freely from a transverse shaft 51, said shaft extending across the space within the inside limits of the casing and having guide blocks 52 on its opposite ends which slide freely diametrically of the casing on a pair of supporting arms 53. These arms extend upwardly from and are socketed in the base A on opposite sides of the casing. The rest wheel being held against lateral movement by its shaft also acts as a lateral guide between the sides of the casing to cause the tire to revolve steadily in a vertical plane. Compression springs 54 and adjusting nuts 55, the latter threaded on said arms, serve to press the wheel against the tire to support the latter under adjusted tension.

Thus when the crank 16 is turned the tire is revolved slowly against the cutting action of the cutter and circumferential grooves are cut in the tread surface according to the position and depth defined by the adjustments above described.

When the tire is mounted and inflated as shown in Fig. 4, the body of the tire has sufficient strength and rigidity to permit the cutter grooving the tire without using a rest. During such operation the rest wheel K' is removed and the tire is more securely held within the circumferentially disposed rollers by urging roller F down upon the tread surface of the tire under the action of compression springs 56 and nuts 57 which are threaded over the supporting arms 23 and 24. Thus as the drive rollers B and C are revolved the tire which is mounted upon the wheel and inflated is caused to move in effective coaction with the cutter. The resiliently supported roller F compensates for any unevenness in the tire surface. In Fig. 1 the roller F bears down by gravity alone or is held from upward movement by setting the bolts 58 tightly against the supporting arms 23 and 24. In both instances, that is when the device is used to groove a mounted or demounted tire, the function of the roller is to assist in holding any one of a number of different sized tires in the device and to compensate for any inequalities of the tread surface.

In Fig. 8 is shown diagrammatically an arrangement of my invention in which the tire L in the form of a casing is hung over a rotatable wheel 60, the latter being journaled freely from an overhung axis on a suitable support such as 61. A groove cutter 62 having gauge rollers 63 and a cutting blade 64 assembled like in the aforesaid cutting element is pivoted at 65 on said support and has universal movement in relation to the tire. The cutter is urged by weight 66 with its cutting blade in groove cutting coaction with the tread surface of the tire as the tire is moved in the direction of the arrows shown. A guide roller 67 journaled on support 61 assists in directing the tire in a rotary path.

In Figs. 9 and 10, the tire M is rotatively supported in an inclined plane by a series of circumferentially disposed guide rollers 68, 69 and 70, suitably journaled on support N and arranged to provide circumferential and side support for the tire. A cutting element O is disposed on said support N with its cutting blade 71 in cutting coactive position as regards the tire surface.

This invention contemplates dressing the tread surface of a tire when held stationary or revolved. In Figs. 11 and 12 P is a standard carrying a stationary circular table 75 upon which the tire casing Q is clamped rigidly in horizontal position by a circular plate 76, said plate serving to hold the lower rim engaging side of the casing upon a supporting ring 77. R is a cutter having the general characteristics of cutter J hereinbefore described, and carrying the cutter blade 78 which is caused to engage and groove the tread when the cutter is moved circumferentially around and in the plane of the tire. During this movement of the cutter gauge rollers 79 are resiliently urged against the tire and compensate for tire surface inequalities. The cutter is held by yoke 80 which is swiveled on standard P and is turned by handle 81. Said yoke also carries a spring pressed inner tire rest or presser foot R' bearing against the inner wall of the casing at a point immediately opposite said cutter. Thus circumferential movement of the yoke carries the cutter and rest to travel in groove cutting coaction with the tire casing. A screw adjustment 82 provides change position of the cutter R across the face of the tire.

Other modifications are contemplated within the spirit of my invention and I desire to have it understood that the invention can be carried out by other means and applied to uses other than those above set forth within the scope of the following claims.

Having described my invention what I claim as new and desire to secure by Letters Patent is:

1. A machine for dressing the tread surface of a tire casing, comprising, a support, a rest on said support adapted to be placed in said casing against the inner wall of its tread, a cutter adapted to be applied to the tread surface of the casing at a point opposite said rest, a carriage for said cutter mounted on said support and movable transversely of the casing, a shaft on said carriage carrying said cutter and reciprocable to vary the depth of cut made by the cutter in said tread surface, resilient means for urging the shaft towards said tread surface, and lever actuated means for withdrawing the shaft and holding said cutter out of contact with said tread surface.

2. A machine for dressing the tread surface of a tire casing, comprising, a support, means revolubly holding and guiding the tire casing in a plane on said support, a cutter movably mounted upon said support and applicable to dress the tread surface as said casing is revolved against the cutting action thereof, a rest placed against the inner wall of said casing substantially opposite the point of contact by the cutter with the tread surface, a guide on said support upon which said rest is movable diametrically of the casing, and resilient means associated with said guide for urging said rest against said inner wall of the casing.

3. A machine for grooving vehicle tires, comprising supporting means, revoluble means on said supporting means for maintaining a tire on a fixed axis, a cutter on said supporting means applicable to and movable to vary the depth of cut and the position of cut imparted thereby in the surface of the tire as said tire is moved, means for adjusting the cutter to vary its position, and means adjoining the cutter and impressed against the surface of the tire to regulate the depth of cut made by the cutter automatically and in accordance with inequalities in the surface of the tire.

4. A machine for dressing the tread surface of a tire, comprising, a support, means for holding a tire and causing a tire to revolve about a fixed axis on said support, a cutter adapted to be applied to the tread surface of the tire, a carriage for said cutter mounted on said support and movable transversely of the plane of the tire, a shaft on said carriage carrying said cutter and reciprocable to vary the depth of cut made by the cutter in said tread surface, a depth gauge associated with said shaft and in contact with the tread surface of the tire and adapted to cause the cutter to dress an irregular tread surface circumferentially at substantially even depth, resilient means for urging the shaft and depth gauge towards said tread surface, and lever actuated means for withdrawing the shaft and holding said cutter and depth gauge out of contact with said tread surface.

5. A machine for dressing the tread surface of a vehicle tire, comprising, a support, a series of rollers compensatingly mounted on said support and arranged to encompass and permit the movement of an irregular surfaced tire circumferentially, means adjustable on said support for engaging the sides of said tire to guide the tire laterally, a cutter on said support with which the tire is caused to engage and dress the surface of the tire circumferentially, and a depth gauge associated with said cutter in contact with the surface of the tire and adapted to cause the cutter to dress the irregular circumferential surface of the tire at even depth.

6. A machine for dressing the tread surface of a tire casing, comprising, a support, a rest on said support adapted to be placed in said casing against the inner wall of its tread, a cutter adapted to be applied to the tread surface of the casing at a point opposite said rest, a carriage for said cutter mounted on said support and movable transversely of the casing, a shaft on said carriage carrying said cutter and reciprocable to vary the depth of cut made by the cutter in said tread surface, resilient means for urging the shaft towards said tread surface, a depth gauge associated with said shaft adapted to produce even depth of cut made by the cutter in an irregular surface of said casing, and means for withdrawing the shaft and holding said cutter out of contact with said tread surface.

7. A machine for dressing the tread surface of a tire casing, comprising, a support, means revolubly holding and guiding the tire casing in a plane on said support, a cutter movably mounted upon said support and applicable to dress the tread surface as said casing is revolved against the cutting action thereof, a rest placed against the inner wall of said casing substantially opposite the point of contact by the cutter with the tread surface, a guide on said support upon which said rest is movable diametrically of the casing, resilient means associated with said guide for urging said rest against said inner wall of the casing, and a depth gauge associated with said cutter and held against said tread surface adapted to cause the cutter to trim said surface at even depth.

8. A machine for dressing the tread surface of a vehicle tire, comprising, means for holding and permitting the movement of an irregular surfaced tire circumferentially, means impressed against and forming a support for the inner wall of the tire, a cutter arranged to engage with the tread surface of the tire as the tire travels and cut a circumferential groove therein, and gauge means adjoining the cutter and impressed against the surface of the tire, said tire and cutter being relatively movable in accordance with the action of the gauge means to compensate for irregularities in the tread surface of the tire and cause the cutter to cut at even depth.

9. A machine for dressing the tread surface of a vehicle tire, comprising, means for revolubly holding and guiding an irregular surfaced tire, a cutter arranged to engage the tread surface of the tire as the latter revolves, a depth gauge movably disposed and having an antifriction element disposed to ride upon the tread surface of the tire, said cutter being thereby adapted to conform with irregularities in and turn the tread surface of the tire at substantially even depth, a support for said cutter and depth gauge and means whereby the cutter is adjusted in relation to the depth gauge to regulate the depth of cut by the cutter.

HORACE F. SCRUBY.